(12) United States Patent
Ferren

(10) Patent No.: US 6,866,317 B2
(45) Date of Patent: Mar. 15, 2005

(54) VEHICLE WITH VARIABLE INTERIOR VOLUME

(75) Inventor: Bran Ferren, 1236 Benedict Canyon Dr., Beverly Hills, CA (US) 90210

(73) Assignee: Bran Ferren, Glendale, CA (US)

(*) Notice: Subject to any disclaimer, the term of this patent is extended or adjusted under 35 U.S.C. 154(b) by 0 days.

(21) Appl. No.: 10/470,793

(22) PCT Filed: Feb. 1, 2002

(86) PCT No.: PCT/US02/02844
§ 371 (c)(1),
(2), (4) Date: Jul. 29, 2003

(87) PCT Pub. No.: WO02/060745
PCT Pub. Date: Aug. 8, 2002

(65) Prior Publication Data
US 2004/0108741 A1 Jun. 10, 2004

Related U.S. Application Data
(60) Provisional application No. 60/265,778, filed on Feb. 1, 2001.

(51) Int. Cl.[7] .............................................. B62D 33/08
(52) U.S. Cl. ................................. 296/26.15; 296/165
(58) Field of Search ........................ 296/26.12, 26.14, 296/26.15, 165, 172, 176

(56) References Cited

U.S. PATENT DOCUMENTS

| | | | |
|---|---|---|---|
| 2,154,810 A | * | 4/1939 | Goeddertz .................. 296/172 |
| 3,737,191 A | | 6/1973 | Fackre |
| 5,934,728 A | | 8/1999 | Nishi et al. |
| 6,053,551 A | | 4/2000 | Blondeau |
| 2002/0149220 A1 | * | 10/2002 | Wishart .................... 296/26.15 |

* cited by examiner

Primary Examiner—Jason Morrow
(74) Attorney, Agent, or Firm—Glenn Patent Group; Michael A. Glenn

(57) ABSTRACT

A vehicle providing a variable interior volume comprises a primary outer structure and an expansion module (17) pivotably connected to the primary structure. A hinged coupling (26) facilitates pivoting movement of the expansion module between a retracted configuration, in which the expansion module is predominantly contained within the primary structure, and a deployed configuration, in which the expansion module is predominantly outside the primary structure. The total interior volume is thus increased as the module is deployed.

17 Claims, 11 Drawing Sheets

VEHICLE WITH VARIABLE INTERIOR VOLUME

This patent application is related to and claims priority from U.S. Provisional Patent Application Ser. No. 60/265,778, filed on Feb. 01, 2001, and from Patent Cooperation Treaty International Application Ser. No. PCT/US02/02844, filed on Feb. 01, 2002, which are incorporated by reference herein.

BACKGROUND

1. Technical Field

This invention relates to a method and apparatus for adjusting the size of an interior volume. More particularly, the invention is related to a method and apparatus providing, adjustable living space, for example within recreational vehicles, military vehicles, and prefabricated housing.

2. Description of the Prior Art

Often, as in the case of recreational vehicles and various military vehicles, an interior space designed for human occupancy must be transported via roadway or similar means. The design of such interiors necessitates a compromise between available interior space and the overall size of the associated vehicle, as generally, the overall size of the vehicle is constrained by factors such as weight, aerodynamic drag, and the width and overhead clearance of the typical roadway.

Several designs proposed in the prior art have sought to avert the negative impacts of this design trade-off with vehicles capable of transforming between two distinct configurations. In these designs, a vehicle typically transforms between a retracted configuration, offering superior road handling but reduced interior space, and a deployed configuration, offering greater interior space but lesser handling characteristics. Typically, the change from the retracted configuration to the deployed configuration involves the assembly, attachment, or erection of an expansion module designed to increase the interior space within the vehicle. An example of such a vehicle is the Eurovan®, manufactured by Volkswagen.

Elements of this approach are seen in many types of vehicles, including those designed strictly for equipment transport. U.S. Pat. No. 4,943,106 to Hunt describes an "equipment trailer having swing-out side extensions provided at each side thereof to enable the overall width of the trailer to be increased when over-width loads are to be carried." However, Hunt's design is limited to open cargo spaces and does not allow for the expansion of an interior space that protects occupants or cargo from outside elements.

Several solutions have been proposed for the expansion of fully enclosed interior spaces. U.S. Pat. No. 4,960,299 to Steadman describes a "mobile accommodation structure such as a caravan or motor home . . . with at least one foldable extension . . . which can be erected from at least one side wall . . . to enlarge the interior volume enclosed by the mobile structure." Similar approaches employing foldable or telescoping floors and walls are disclosed in U.S. Pat. No. 2,906,556 to Cantele et al. and U.S. Pat. No. 2,898,143 to Ferrera.

While such approaches provide a larger interior space, the folding and telescoping nature of the floors and walls results in a complicated deployment process that is often labor intensive. Furthermore, the topological transformation in such systems between retracted and deployed configurations prohibits permanent and continued use of the interior space provided by the expansion modules. Furniture, appliances, and similar items must be arranged within the expansion module each time it is deployed.

Figure 1:
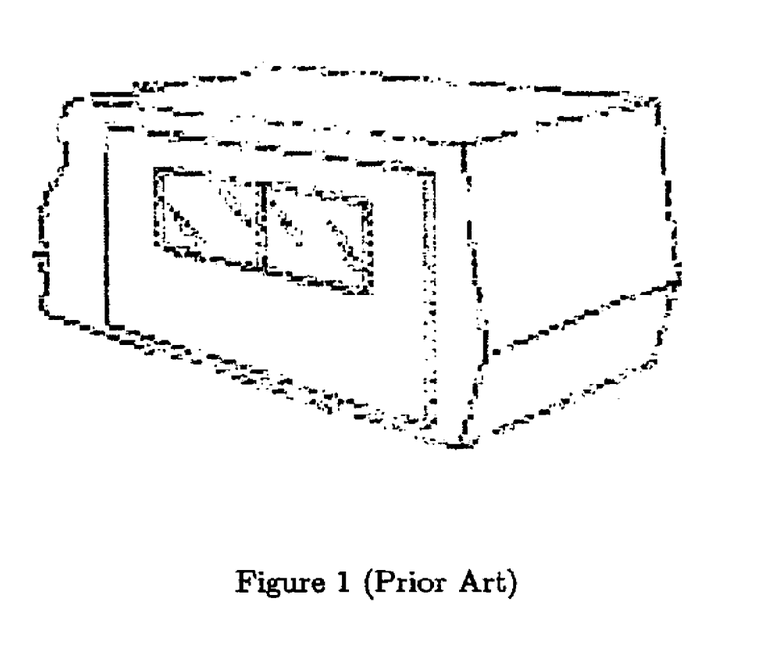
FIG. 1 shows a perspective view of a prior art recreational vehicle with an expansion module in a retracted configuration.
Figure 2:
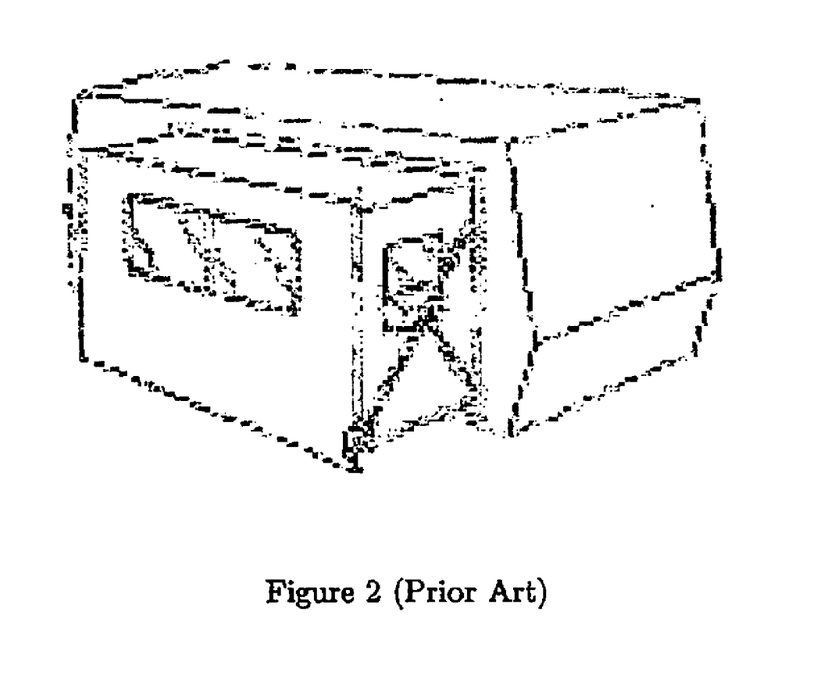
FIG. 2 shows a perspective view of a prior art recreational vehicle with an expansion module in a deployed configuration.

An approach addressing this shortcoming, most popular with recreational vehicles, is expansion modules outwardly deployed with a linear, sliding motion. FIG. 1 shows a perspective view of a prior art recreational vehicle with an expansion module in a retracted configuration. FIG. 2 shows a perspective view of a prior art recreational vehicle with an expansion module in a deployed configuration. This particular design, detailed in U.S. Pat. No. 6,152,520 to Gardner, incorporates "support arms [that] are connected to the slide out room by a pivoting connection and are connected to the main living area by a connection which both pivots and slides vertically," providing a level, linear deployment of the slide out room (expansion module). Similar designs are found in U.S. Pat. No. 6,257,638 to Graber and U.S. Pat. No. 5,860,686 to Tiedge.

The large number of moving components and linkages in these designs, however, results in an excessively complicated system with many potential points and modes of failure. The complexity of the deployment mechanism also increases the likelihood that the expansion module jams during deployment. This common shortcoming is evidenced by the extraordinary amount of effort in the prior art devoted to alleviating this difficulty—efforts that have primarily provided only increasingly complicated and expensive systems. Furthermore, the large number of connections, supports, and articulated members between the expansion module and the primary vehicle structure complicates attempts to seal the combined interior space from outside elements, such as rain and wind. Complex linkages also demand substantial clearance between the primary vehicle structure and the expansion module, reducing the distance between the opposing walls or floor and ceiling of the expansion module, and therefore reducing the amount of additional interior space provided. A large clearance between the primary structure and expansion module also creates a visually unappealing interior threshold at the transition between the primary structure and expansion module. Finally, the linear motion of the sliding expansion modules restricts the possible module shapes. Indeed, the great majority of prior art expansion modules of this nature are simple rectangular solids, yielding aesthetically cold and crude interior lines.

What is needed is a simple and effective device that provides a variable amount of interior space within a vehicle without compromising the roadworthiness of the vehicle. The approach should offer convenient and reliable transformation between retracted and deployed configurations with minimal or no manual labor. The transformation should allow for continuous occupation of the interior space provided by the expansion module. The mechanisms enabling the transformation must be simple and reliable.

In particular, the mechanisms should resist jamming of the expansion module during deployment and should facilitate effective sealing of the combined interior space against outside elements. Furthermore, the device should require a minimal amount of clearance between the expansion module and the primary vehicle structure, yielding a minimal reduction in the size of the expansion module. Finally, the approach should provide an aesthetically pleasing combined interior volume.

SUMMARY

The preferred embodiment of the invention is directed to a vehicle having a simple and effective mechanism for varying the interior volume of the vehicle. The presently preferred embodiment of the invention comprises a primary outer structure which defines a primary interior volume, and an auxiliary structure that is hingedly connected to the primary structure and that defines an auxiliary interior volume. The hinged coupling facilitates movement of the auxiliary outer structure between a retracted configuration, in which the auxiliary interior volume is predominantly coincident with the primary interior volume, and a deployed configuration, in which the auxiliary interior volume is predominantly disjoint from the primary interior volume. The combined interior volume collectively defined by the primary and auxiliary interior volumes is increased as the auxiliary structure is moved from the retracted to deployed configuration.

The preferred embodiment of the invention uses sealing material to seal the interface between the auxiliary structure and the primary structure, thus insulating the combined interior volume from outside elements. Other embodiments of the invention also include a bearing mechanism that transfers the load of the auxiliary structure from the hinged connection to a bearing surface. Other embodiments of the invention also incorporate a mechanical means, such as a rack and pinion apparatus, for moving the auxiliary structure between the retracted and deployed configurations. The mechanical means may be operated manually or powered by a power source onboard or offboard the vehicle. Other embodiments also incorporate a supplementary outer structure, deployed from within an auxiliary outer structure that further increases the combined interior volume.

Vehicles may also be constructed with multiple auxiliary structures. These modules are oriented such that the interior volumes defined by each auxiliary structure are disjoint from one another. Alternatively, the structures are oriented such that, during retraction, outer auxiliary structures hingedly telescope within inner auxiliary structures. Auxiliary structures may be hingedly coupled along axes including, but not limited to, vertical and horizontal axes. Auxiliary structures also facilitate interconnection between two vehicles.

Finally, other embodiments of the invention are also applicable to prefabricated housing and transportable storage containers.

DESCRIPTION

The invention is directed towards a vehicle having a variable interior volume that may be alternately configured for greater interior volume and therefore greater interior comfort, or lesser interior space and therefore optimum road handling. The variation in interior volume is achieved through the movement of an auxiliary outer structure, or expansion module, that is hingedly connected to the primary structure of the vehicle. The combined interior volume of the primary structure and expansion module is increased when the expansion module is moved from a retracted to a deployed configuration.

Figure 3:
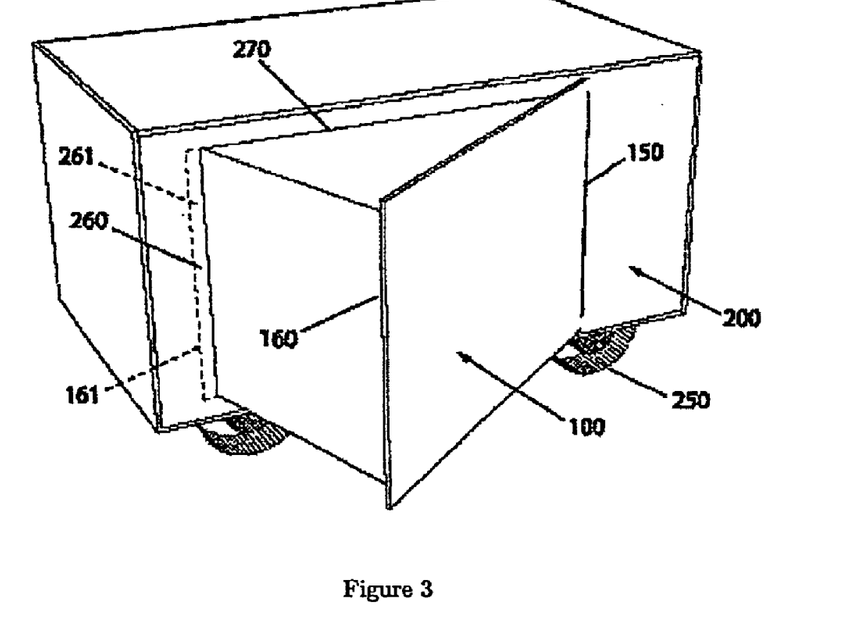
FIG. 3 shows a vehicle with variable interior volume, in a deployed configuration according to the invention.

FIG. 3 shows a vehicle with variable interior volume, in a deployed configuration according to the invention. The expansion module 100 is connected by a hinge 150 to the primary structure 200 of the vehicle. Movement of the expansion module 100 between retracted and deployed configurations is facilitated by an aperture 270 in the primary structure. In the deployed configuration, the aperture also marks a threshold between the interior volume associated with primary structure and the additional interior volume provided by the expansion module. The primary structure of the vehicle is coupled to the means of conveyance 250 of the vehicle. In the embodiment shown in FIG. 3, the means of conveyance is a set of wheels. The wheels may be driven by a power source on board the vehicle, or as, shown in FIG. 3, by a power source external to a towed vehicle.

In the presently preferred embodiment of the invention the inner extent of the expansion module is essentially flush with the outer extent of the primary structure, when in the deployed configuration. Accordingly, the interior volume associated with the expansion module is essentially disjoint from the interior volume associated with the primary structure. The outward range of motion of the expansion module during deployment is limited by the engagement of an inner flange 161 with an inner seating surface 261 of the primary structure. Correspondingly, the inward range of motion of the expansion module during retraction is limited by the engagement of an outer flange 160 with an outer seating surface 260. Other embodiments of the invention may provide latching or locking means to secure the expansion module in either or both the retracted and deployed configurations. In yet other embodiments of the invention, it may be possible to deploy the expansions module partially, e.g. moving it to positions between the fully retracted and fully deployed positions.

Figure 4:
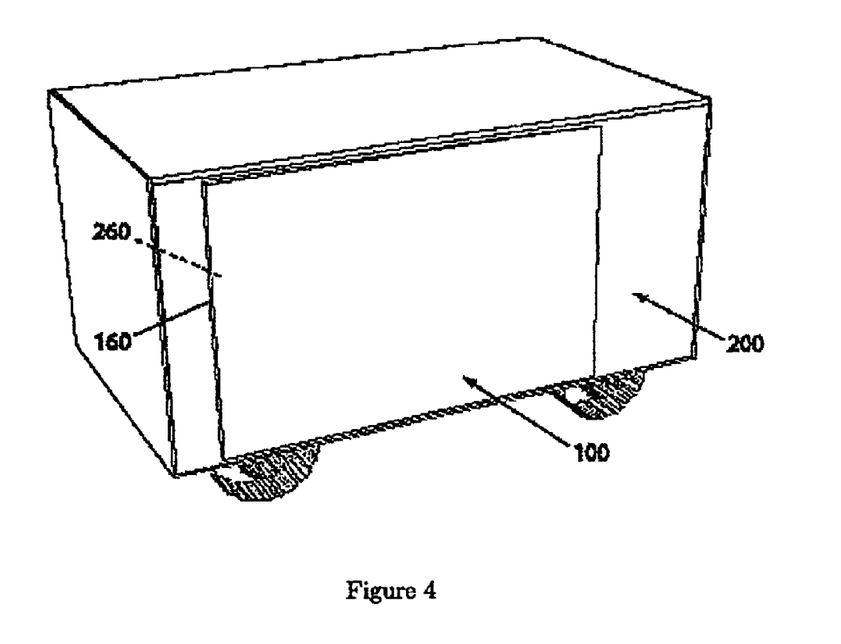
FIG. 4 shows a vehicle with variable interior volume, in a retracted configuration according to the invention.

FIG. 4 shows a vehicle with variable interior volume, in a retracted configuration according to the invention. As described previously, the outer flange 160 is engaged with the outer seating surface 260 of the primary structure. In this configuration, the outer extent of the expansion module 100 is essentially flush with the outer extent of the primary structure 200. The interior volume defined by the expansion module is nearly entirely coincident with the interior volume defined by the primary structure.

Typically, the primary structure and the expansion module are constructed of a high strength, lightweight material. Fiberglass and various composites are suitable in some embodiments, as are aluminum and other lightweight metals. Steel and other heavier metals may be used in other embodiments where reduced weight is of lesser importance.

The hinged connection of the expansion module to the primary structure of the vehicle allows for a simple and efficient increase in vehicle interior volume. Occupants of the vehicle can enjoy extensive interior living space while the expansion module is deployed, yet the handling characteristic of the vehicle are restored when the expansion module in returned to the retracted configuration. The ability of the expansion module to pass through an aperture of the primary structure allows the shape of the module to be preserved throughout the deployment process. Thus, the expansion module may be continuously occupied by persons or possessions.

In contrast to systems disclosed in the prior art, deployment is achieved without complicated linkages or attachments. Furthermore, the angular motion of the expansion module during deployment greatly lessens the likelihood of binding. Finally, the angular deployment also results in a softer, more aesthetically pleasing transition between the interior volume of the primary structure and the interior volume of the expansion module. This transition supports greater usability, from an interior design and decorating standpoint, of the combined interior space.

Hinged deployment also allows for a wide range of expansion module shapes. For example, various embodiments of the invention incorporate different module shapes as warranted by the particular end use of the combined interior space. Generally, the geometric shape of the expansion module is only constrained to lie within a circular sector, the radius of the sector defined by the distance between the hinge and the opposing edge of the aperture in the primary structure, and the chord of the sector defined by the inner dimensions of the primary structure.

Figure 5:
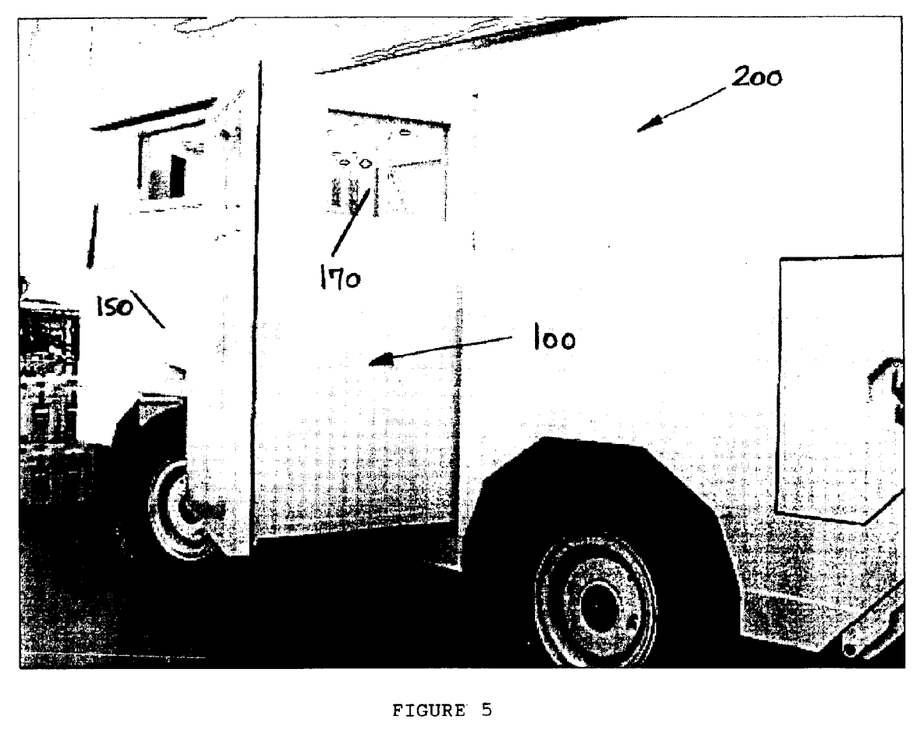
FIG. 5 shows a front perspective view of a trailer based living quarters with variable interior volume according to the invention.

FIG. 5 shows a front perspective view of a trailer based living quarters with variable interior volume according to the invention. As described previously, the expansion module 100 is connected with a hinge 150 to the primary structure 200 of the vehicle. To improve the habitability of the combined interior space, the expansion module has been equipped with a window 170.

Figure 6:
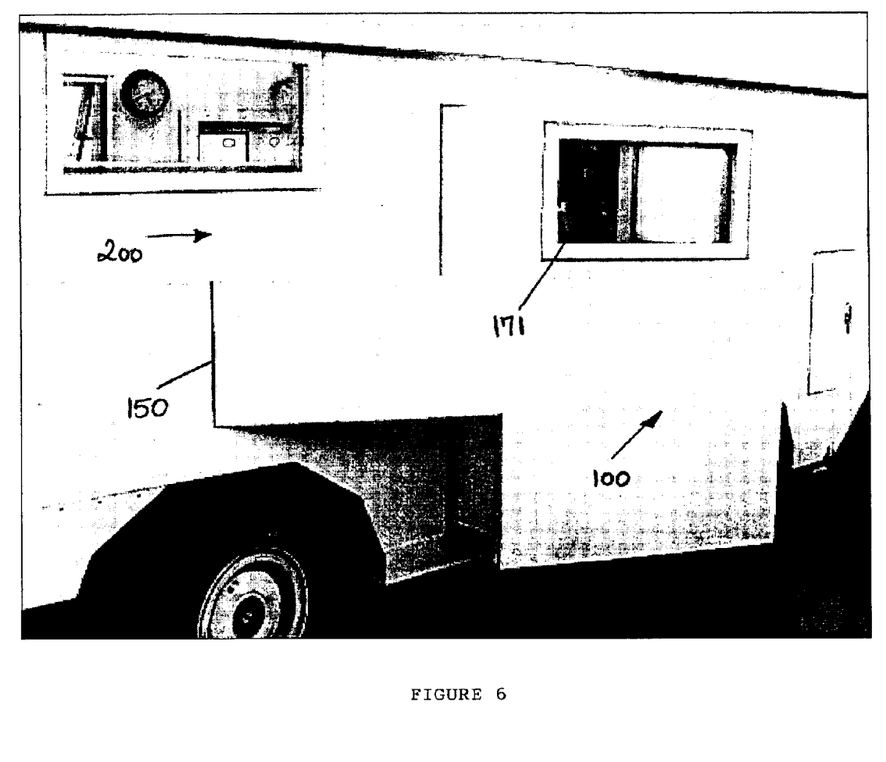
FIG. 6 shows a rear perspective view of a trailer based living quarters with variable interior volume according to the invention.

FIG. 6 shows a rear perspective view of a trailer based living quarters with variable interior volume according to the invention. Again shown are the expansion module 100, hinge 150, and primary structure 200 of the vehicle. A second window 171 is also shown.

Figure 7:
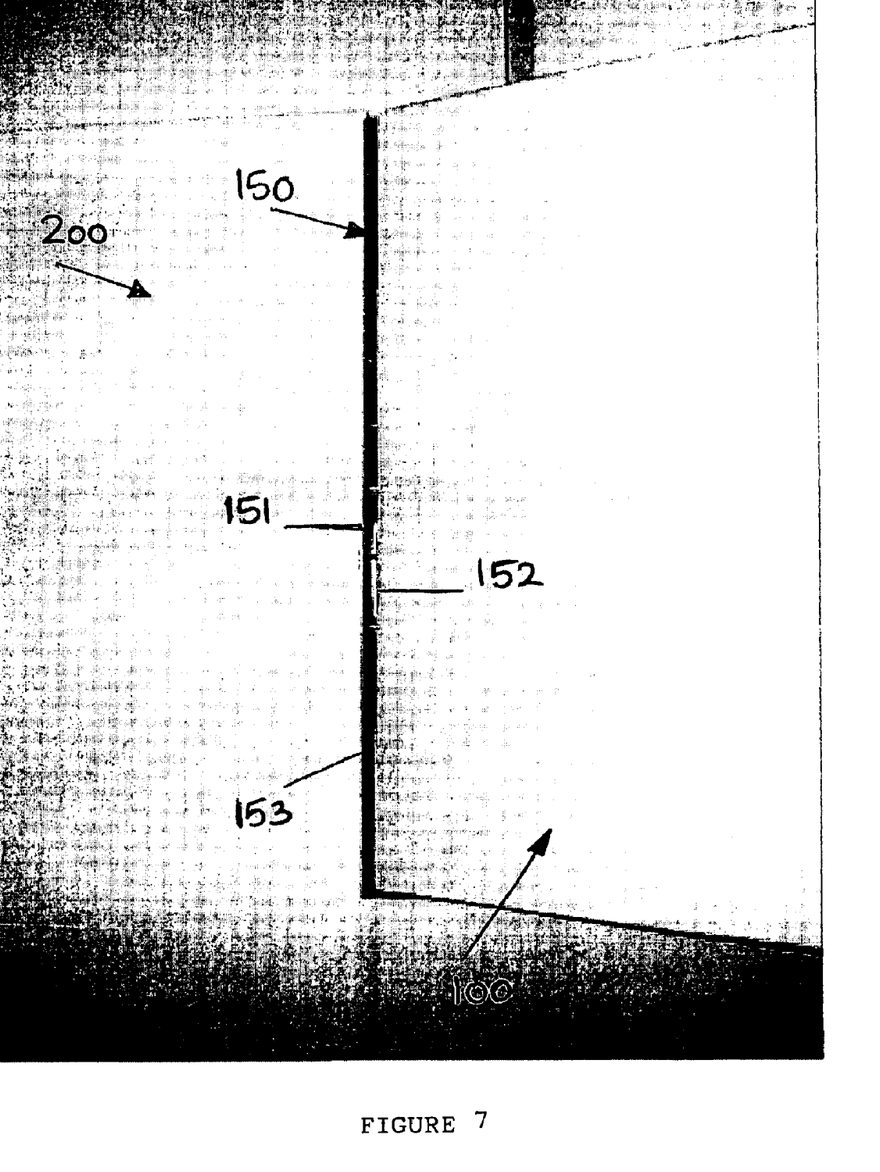
FIG. 7 shows a detailed view of the hinged connection according to the invention.

FIG. 7 shows a detailed view of the hinged connection according to the invention. In other embodiments of the invention, the expansion module is partly supported by rolling or sliding bearings deployed along an arc at a radial location between the hinge and the outermost extent of the expansion module. However, in other embodiments, including the preferred embodiment, the hinge bears the entire load of the expansion module when in the deployed configuration. The hinge is therefore typically constructed of a high strength and preferably low weight metal. FIG. 7 shows one such hinge 150, a Daro Industries 600 Series hinge. A hinge pin 153 is axially aligned and engaged with hinge barrels 151 and 152 alternately connected to the expansion module 100 and the primary structure 200 of the vehicle.

The hinged connection between the expansion module and primary structure allows for simple removal of the expansion module, and the connection of an alternate expansion module. In this manner, expansion modules of differing aesthetic or functionality are conveniently interchanged in a modular manner. Variations in the exterior shape of the interchanged modules is also possible, provided each module is compatible with the aperture in the primary structure.

Figure 8:
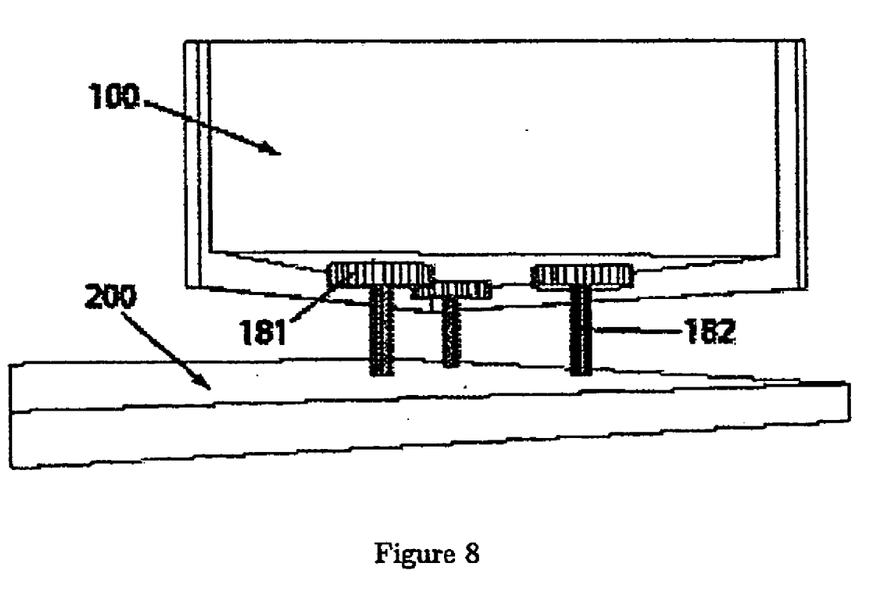
FIG. 8 shows a detailed view of a bearing assembly to bear the weight of a retracted expansion module according to the invention.

FIG. 8 shows a detailed view of a bearing assembly to bear the weight of a retracted expansion module according to the invention. As noted, in some embodiments, the hinged connection bears the entire load of the deployed expansion module. This may be unsuitable for a retracted module, though, because the dynamic loads encountered during transport typically exceed those encountered while the vehicle is stationary. A bearing system such as that shown in FIG. 8 addresses this issue.

In the embodiment shown, once the expansion module 100 has reached the retracted configuration, hydraulic cylinders 182 coupled with the primary structure 200 of the vehicle actuate the upward movement of bearing surfaces 181, until contact with the lower surface of the expansion module is obtained. Preferably, the hydraulic cylinders are equipped with a load sensing feedback loop, designed to continue actuation of the bearing surfaces until each bearing surface bears an appropriate fraction of the entire load of the expansion module. In this manner, the bearing system alleviates the load on the hinge when the expansion module is in the retracted configuration. Alternatively, the transfer of load from the hinged connection to a bearing surface may be automatically accomplished by a wedging or camming action, which is activated by the inward travel of the expansion module during retraction.

Figure 9:
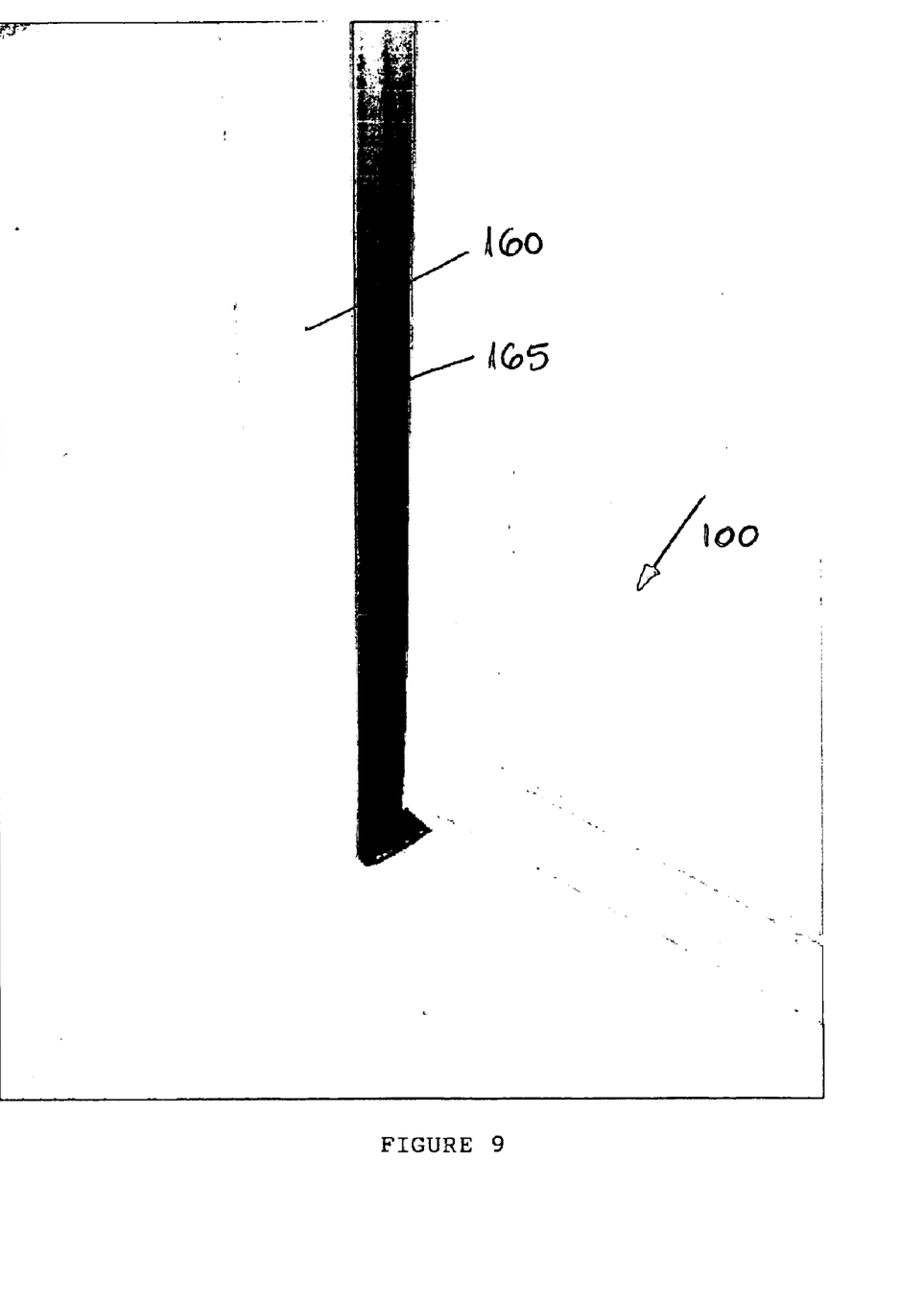
FIG. 9 shows a detailed view of a seal for sealing the combined interior of the primary vehicle structure and expansion module according to the invention.

FIG. 9 shows a detailed view of a seal for sealing the combined interior of the primary vehicle structure and expansion module according to the invention. Other embodiments of the invention may provide a means for sealing the combined interior volume of the primary structure and expansion module from outside elements such as wind, rain, and cold. In the preferred embodiment, a sealing material 165 is located on the outer flange 160 of the expansion module 100, as shown in FIG. 9. Sealing material is also located on the inner 161 flange of the expansion module. The combined interior volume is thus effectively sealed when the expansion module is in either the retracted or deployed configuration. Seals are alternatively or additionally located on the inner 261 and outer 262 seating surfaces of the primary structure. In the preferred embodiment of the invention, a brush seal is also incorporated in the clearance region between the moving expansion module and the aperture. The brush seal minimizes the intrusion of wind, cold and moisture as the expansion modules moves between retracted and deployed configurations.

Figure 10:
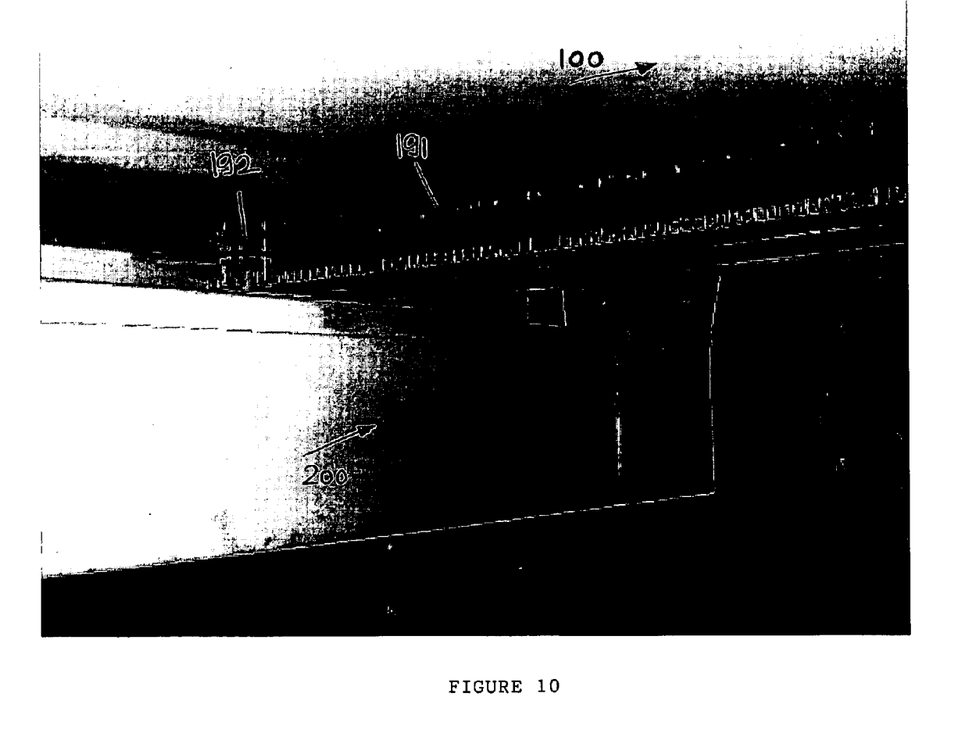
FIG. 10 shows a detailed view of a rack and pinion apparatus for moving the expansion module between retracted and deployed configurations according to the invention.

FIG. 10 shows a detailed view of a rack and pinion apparatus for moving the expansion module between retracted and deployed configurations according to the invention. A rack 191 forming a sector of a circular ring gear is coupled with the expansion module 100 and engages a pinion 192 coupled to the primary structure 200 of the vehicle. Rotation of the pinion moves the expansion module between retracted and deployed configurations.

Alternatively, the pinion may be coupled with the expansion module and the rack with the primary structure. Other embodiments of the invention may employ alternative mechanical means for moving the expansion module including, but not limited to, wheels, rollers, cable and pulley systems, hydraulic systems, pneumatic systems, and linear actuators. These mechanical means may be powered manually, or they may be powered by a power source onboard or offboard the vehicle. If the movement of the expansion module is powered, it is preferred that the mechanical means provide a manual override mode of operation, thus allowing manual movement of the module in the event of a power failure. The rack and pinion mechanism of FIG. 10 requires a minimal amount of clearance between the expansion module and primary structure. This, in turn, minimizes the interior threshold marking the transition between the interior volumes defined by the primary structure and expansion module.

Figure 11:
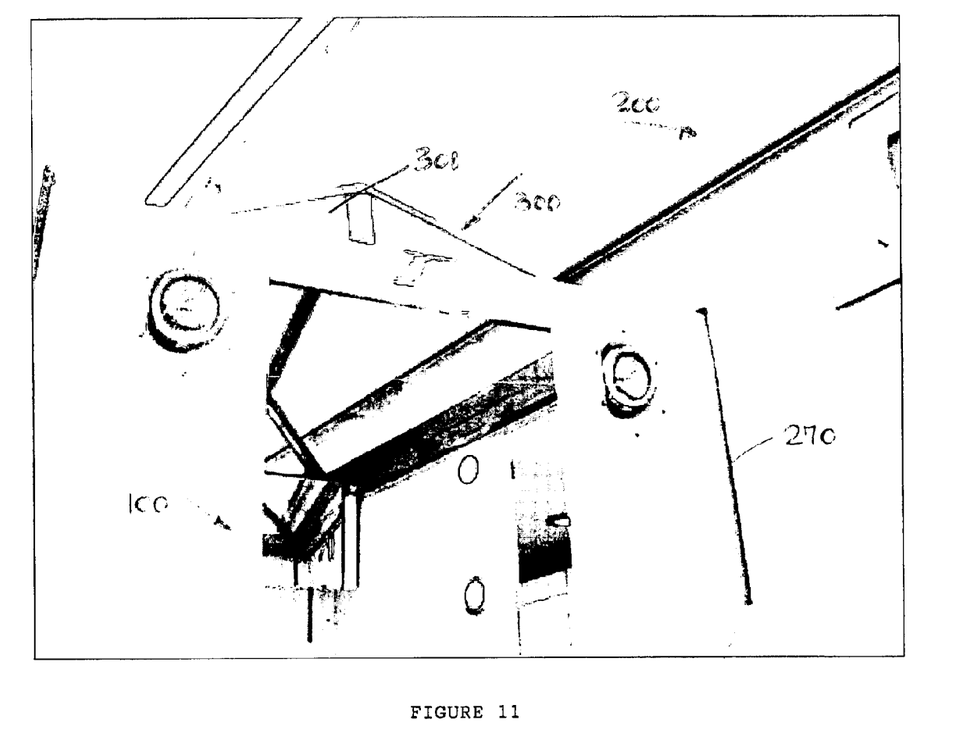
FIG. 11 shows a supplementary outer structure which is linearly deployed in a sliding manner from an expansion module, according to the invention.

FIG. 11 shows a supplementary outer structure which is linearly deployed in a sliding manner from an expansion module according to the invention. The supplementary structure 300 is moved in a linear sliding fashion between a retracted configuration to the deployed configuration shown. When in the retracted configuration, the supplementary structure lies within the interior volume defined by the expansion module 100, thus allowing the expansion module 100 to be retracted through the aperture 270 in the primary structure 200. Thus, the supplementary structure provides a further increase in the total interior volume. In the preferred embodiment shown in FIG. 11, the supplementary exterior structure 300 includes a skylight 301. Similar structures may be incorporated to enhance the inhabitability and aesthetic appeal of the interior space of the expansion module.

Figure 12:
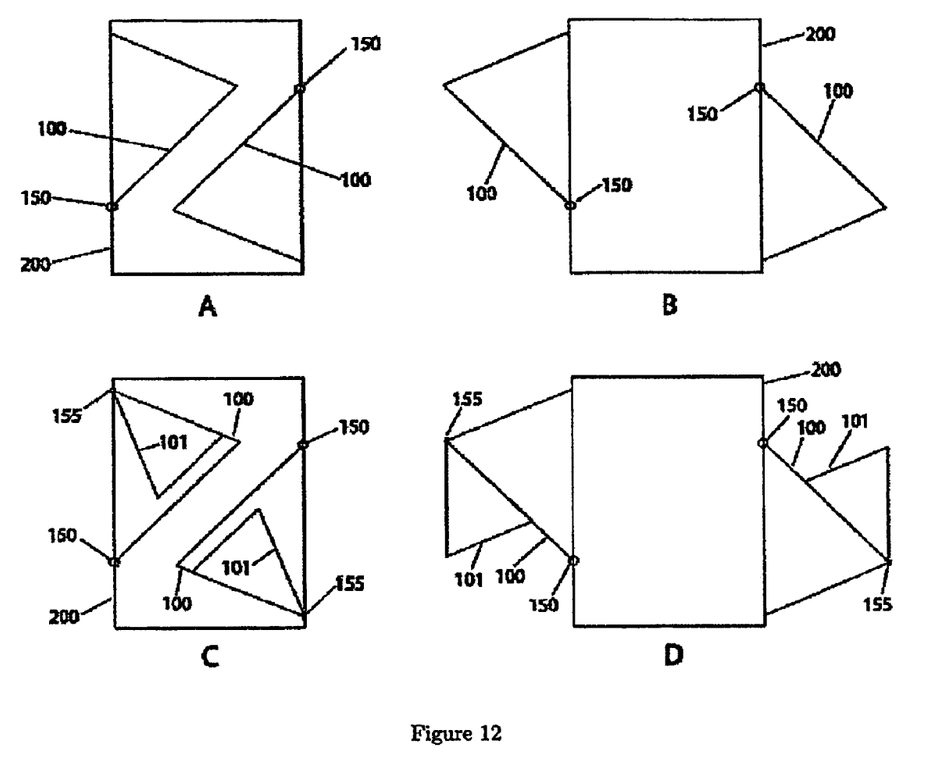
FIGS. 12A through 12D show schematic representations of vehicles that incorporate multiple expansion modules according, to the invention.

FIGS. 12A–D show schematic representations of vehicles that incorporate multiple expansion modules according to the invention. Use of multiple expansion modules provides a further increase in interior volume and a more sophisticated interior layout. FIG. 12A shows a vehicle incorporating two expansion modules in a retracted position. The modules 100 are hinged 150 from opposing sides of the vehicle structure 200, and are further oriented such that they interleave when retracted. Interleaving the modules in this manner provides a maximum increase in interior volume for a given interior volume of the primary structure. FIG. 12B shows the modules in a deployed configuration.

Multiple modules may also be incorporated in a hinged, telescoping arrangement as shown in FIGS. 12C and 12D. In the embodiment shown, a second expansion module 101 is connected by a second hinge 155 to the first expansion module 100. In a retracted configuration, shown in FIG. 12C, the second expansion module is contained within the first expansion module. The first expansion module in turn is contained within the primary structure 200 of the vehicle. FIG. 12D shows the telescoping modules in a deployed configuration.

Expansion modules may also be configured in a manner allowing interconnection between the interior space of two vehicles. In such embodiments, the expansion modules may incorporate latches, seals, and portals to allow the interior spaces of the two vehicles to be combined in a secure and insulated manner.

As one skilled in the art will appreciate, the number of expansion modules and the arrangement of the expansion modules may be varied to yield a great variety of vehicle configurations. Furthermore, although in the preferred embodiment the units are hinged about vertical axes and deployed in a lateral manner, in other embodiments it may be desirable to hinge the modules about other axes. In particular, expansion modules may be hinged about horizontal axes to provide increased volume above or below the primary structure.

The invention addresses the identified shortcomings in the prior art, providing a simple and reliable method of providing adjustable living space, particularly within recreational vehicles and military field vehicles. However, the invention may also find application in areas other than vehicle based living quarters. In particular, the invention is also applicable to prefabricated housing and transportable storage containers.

Figure 13:
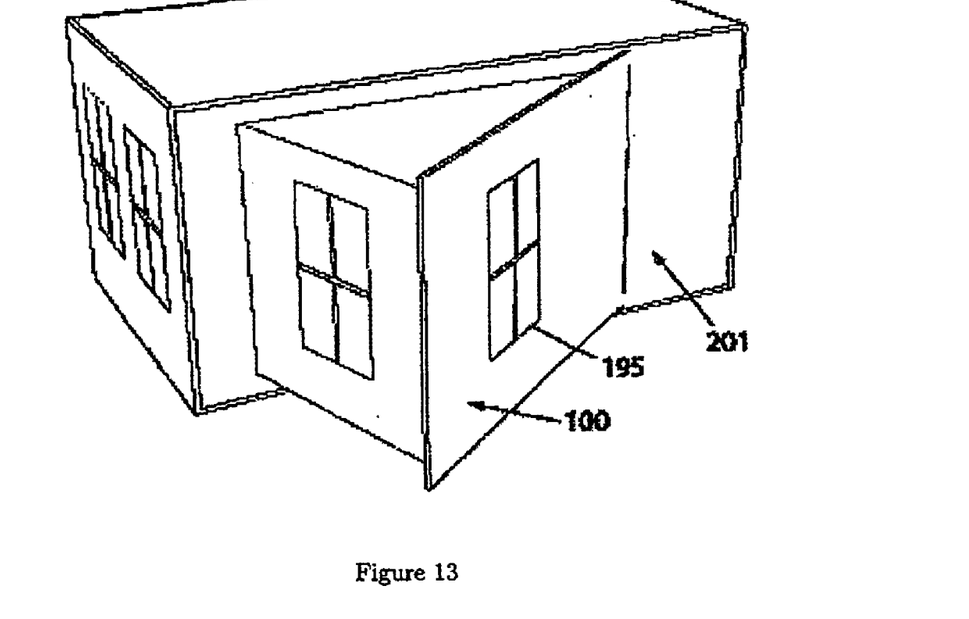
FIG. 13 shows a prefabricated home with variable interior volume according to the invention.

FIG. 13 shows a prefabricated home with variable interior volume according to the invention. In this embodiment of the invention, deployment of the expansion module 100 increases the livings space within the prefabricated home 201. In this embodiment, it may be desirable for the expansion module to incorporate features such as windows 195.

Figure 14:
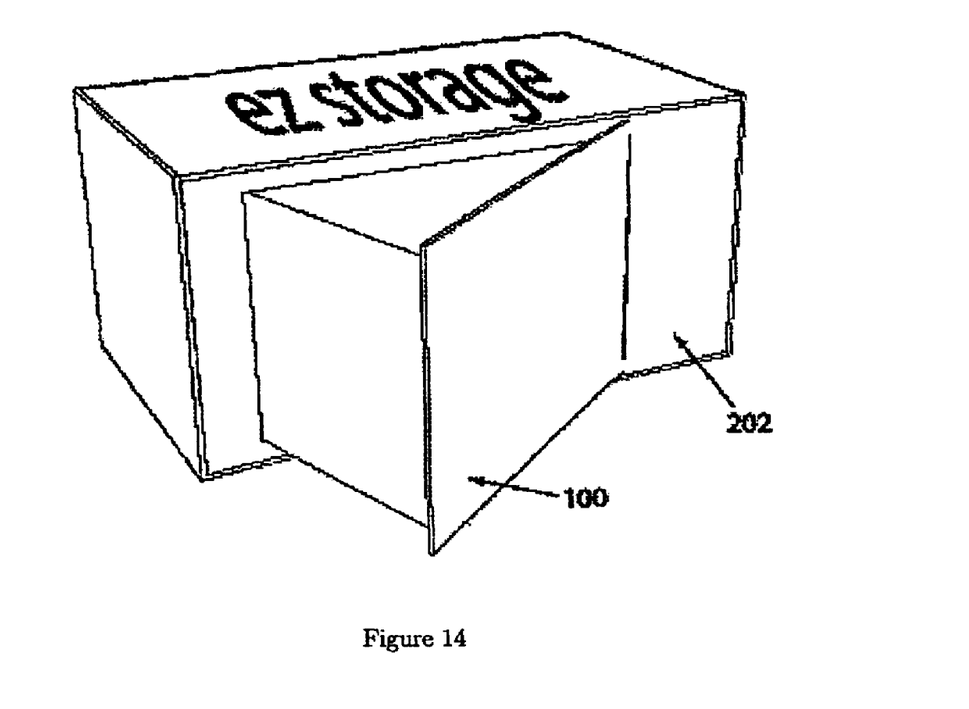
FIG. 14 shows a transportable storage unit with variable interior volume according to the invention.

FIG. 14 shows a transportable storage unit with variable interior volume according to the invention. In this embodiment of the invention, the expansion module 100 is typically deployed once the container 202 has been placed at the storage site, and provides an increase in storage space. The expansion module may be retracted prior to removal of the storage container from the storage site.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

What is claimed is:

1. A vehicle, comprising:
 a primary outer structure, substantially defining a primary interior volume;
 a first auxiliary outer structure substantially defining a first auxiliary interior volume, said first auxiliary outer structure pivoting relative to said primary outer structure between a retracted configuration, in which said first auxiliary interior volume is substantially coincident with said primary interior volume, and a deployed configuration, in which said first auxiliary interior volume is substantially disjoint from said primary interior volume;
 a second auxiliary outer structure, substantially defining a second auxiliary interior volume, said second auxiliary outer structure pivoting relative to said primary outer structure between a retracted configuration, in which said second auxiliary interior volume is substantially coincident with said primary interior volume, and a deployed configuration, in which said second auxiliary interior volume is substantially disjoint from said primary interior volume;
 wherein said first auxiliary outer structure and said second auxiliary outer structure are hinged at diagonally opposed locations, said first auxiliary outer structure's inner surface and said secondary auxiliary outer structure's inner surface being paralleled abutting one another when they are in said retracted position; and
 wherein said primary and said auxiliary interior volumes collectively define a combined interior volume that is increased when said auxiliary outer structures are moved from said retracted configuration to said deployed configuration.

2. The vehicle of claim 1, said auxiliary interior volume substantially comprising either of:
   an angular sector of a cylinder; and
   an isosceles triangular prism.

3. The vehicle of claim 1, wherein said auxiliary outer structure is hingedly coupled to said primary outer structure.

4. The vehicle of claim 3, wherein said auxiliary outer structure is hingedly coupled to said primary outer structure along either of a substantially vertical axis and a substantially horizontal axis.

5. The vehicle of claim 3, wherein said auxiliary outer structure is moved from said retracted configuration to said deployed configuration in either of a substantially horizontal plane and a substantially vertical plane.

6. The vehicle of claim 3, said hinged coupling comprising:
   uncoupling means for uncoupling said auxiliary outer structure from said primary outer structure;
   wherein an alternative auxiliary outer structure is hingedly connected to said primary outer structure for exchange, in a modular fashion, with said auxiliary outer structure.

7. The vehicle of claim 1, further comprising:
   means for sealing said combined interior volume from an exterior environment.

8. The vehicle of claim 7, said primary outer structure comprises:
   a first seating surface; and
   a second seating surface;
   said means for sealing comprising:
      a first sealing flange which is seated against said first seating surface when any of said auxiliary outer structure is in said retracted configuration; and
      a second sealing flange which is seated against said second seating surface when any of said auxiliary outer structure is in said deployed configuration;
      wherein said combined interior volume is substantially sealed from said exterior environment in both said retracted and deployed configurations.

9. The vehicle of claim 1, wherein said primary outer structure comprises:
   a load bearing means for bearing at least a portion of the weight of said auxiliary outer structure when said auxiliary outer structure is in said retracted configuration;
   wherein at least a portion of the weight of said auxiliary outer structure is relieved from said hinged coupling during transport of said vehicle.

10. The vehicle of claim 1, further comprising:
    means for moving any said auxiliary outer structure between said retracted configuration and said deployed configuration.

11. The vehicle of claim 10, wherein said means for moving comprises:
    a rack comprising a sector of a ring gear; and
    a pinion;
    wherein said rack and said pinion are collectively coupled to said primary outer structure and said auxiliary outer structure;
    wherein said rack is engaged with said pinion;
    wherein rotation of said pinion actuates a movement of said auxiliary outer structure between said retracted and said deployed configurations.

12. The vehicle of claim 1, further comprising:
    a first supplementary outer structure, slidably coupled with said first auxiliary outer structure and substantially defining a first supplementary interior volume;
    a second supplementary outer structure, slidably coupled with said second auxiliary outer structure and substantially defining a second supplementary interior volume;
    wherein said slidable coupling facilitates a linear movement of any of sid supplementary outer structures between;
    a retracted configuration, in which said first supplementary interior volume is substantially coincident with said first auxiliary interior volume and said second supplementary interior volume is substantially coincident with said second auxiliary interior volume; and
    a deployed configuration, in which said first supplementary interior volume is substantially disjoint from said first auxiliary interior volume and said second supplementary interior volume is substantially disjoint from said second auxiliary interior volume;
    wherein said primary interior volume, said auxiliary interior volumes, and said supplementary interior volumes collectively define a combined auxiliary interior volume that is increased when said auxiliary outer structures and said supplementary outer structures are moved from said retracted configuration to said deployed configuration.

13. The vehicle of claim 12, wherein said first supplementary outer structure and sid second supplementary outer structure are hinged at opposed locations, said first supplementary outer structure's inner surface and said secondary supplementary outer structure's inner surface being paralleled abutting one another when they are in said retracted position.

14. The vehicle of claim 12, wherein any of said supplementary outer structures, when moved from said deployed to said retracted configuration, hingedly telescopes within said auxiliary outer structure to which said supplementary outer structure is coupled.

15. The vehicle of claim 1, wherein said auxiliary outer structure comprises:
    coupling means for coupling said auxiliary outer structure to a second auxiliary outer structure of a second vehicle;
    wherein said coupling providing a contiguous union of said combined interior volume of said vehicle with a combined interior volume of said second vehicle.

16. An apparatus that defines a transportable interior volume, comprising;
    a primary outer structure, substantially defining a primary interior volume;
    a first auxiliary outer structure, substantially defining a first auxiliary interior volume, said first auxiliary outer structure pivoting relative to said primary outer structure between a retracted configuration, in which said first auxiliary interior volume is substantially coincident with said primary interior volume, and a deployed configuration, in which said first auxiliary interior volume is substantially disjoint from said primary interior volume;
    a second auxiliary outer structure pivoting relative to sad primary outer structure between a retracted configuration, in which said second auxiliary interior volume is substantially coincident with said primary interior volume, and a deployed configuration, in which said second auxiliary interior volume is substantially disjoint from said primary interior volume;

wherein said first auxiliary outer structure and said second auxiliary outer structure are hinged at diagonally opposed locations, said first auxiliary outer structure's inner surface and said secondary auxiliary outer structure's inner surface being paralleled abutting one another when they are in said retracted position; and wherein said primary and said auxiliary interior volumes collectively define said transportable interior volume, said transportable interior volume being increased when said auxiliary outer structures are moved form said retracted configuration to said deployed configuration.

17. The apparatus of claim 16, wherein said transportable interior volume is any of:

a trailer home; and a transportable storage container.

* * * * *